United States Patent [19]
Watanabe

[11] Patent Number: 5,853,627
[45] Date of Patent: Dec. 29, 1998

[54] PLASTIC MOLDING APPARATUS AND METHOD

[75] Inventor: Jun Watanabe, Atsugi, Japan

[73] Assignee: Ricoh Company, Ltd., Tokyo, Japan

[21] Appl. No.: 965,845

[22] Filed: Nov. 7, 1997

[30] Foreign Application Priority Data

Nov. 7, 1996 [JP] Japan .................................... 8-294688
Mar. 12, 1997 [JP] Japan .................................... 9-057428

[51] Int. Cl.$^6$ .................................................. B29D 11/00
[52] U.S. Cl. ............................ 264/2.3; 264/1.9; 264/2.7; 264/2.6; 264/334; 425/395; 425/407; 425/408; 425/436 R; 425/446; 425/808
[58] Field of Search ................................ 264/1.1, 1.9, 2.2, 264/2.3, 2.6, 2.7, 334; 425/395, 394, 403, 407, 408, 436 R, 436 RM, 445, 446, 808

[56] References Cited

U.S. PATENT DOCUMENTS 5,494,615  2/1996  Lee ........................................... 264/275
5,603,871  2/1997  Koseko et al. ............................ 264/1.9

FOREIGN PATENT DOCUMENTS 4-163119  6/1992  Japan .
5-220860  8/1993  Japan .

*Primary Examiner*—Mathieu D. Vargot
*Attorney, Agent, or Firm*—Oblon, Spivak, McClelland, Maier & Neustadt, P.C.

[57] ABSTRACT

A plastic molding apparatus and method employs a pair of dies having at least one cavity with a mirror surface and wherein a plastic base material which is pre-molded is inserted into the cavity and clamped by the pair of dies. The plastic base material is then heated and melted at glass transition temperature or higher so that a resin internal pressure is generated, and then the plastic base material is annealed so that the mirror surface is transferred to the plastic base material. One of the dies has a separation die in which the cavity is formed. A cavity forming portion thereof has a cavity forming surface and a cavity side board portion which is adjacent to the cavity forming portion and surrounds the cavity forming surface. A separating die clamping structure clamps the separation die from both sides so as to compress an elastic member mounted between the cavity forming portion and the cavity side board. When the clamping pressure is released, the cavity forming portion and the cavity side board portion separate due to a resiliency of the elastic member. An engagement portion is formed at both edge portions of the cavity forming portion which contacts the cavity side board portion so as to engage with the plastic base material and control the release of the molded plastic from the dies.

33 Claims, 13 Drawing Sheets

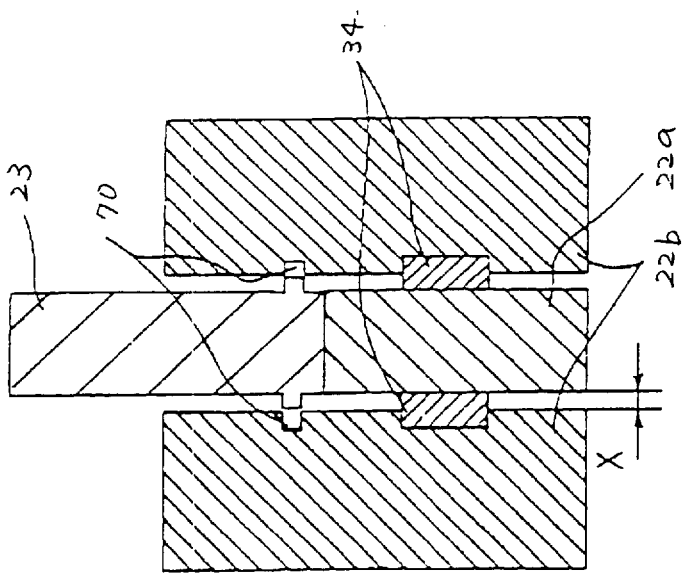
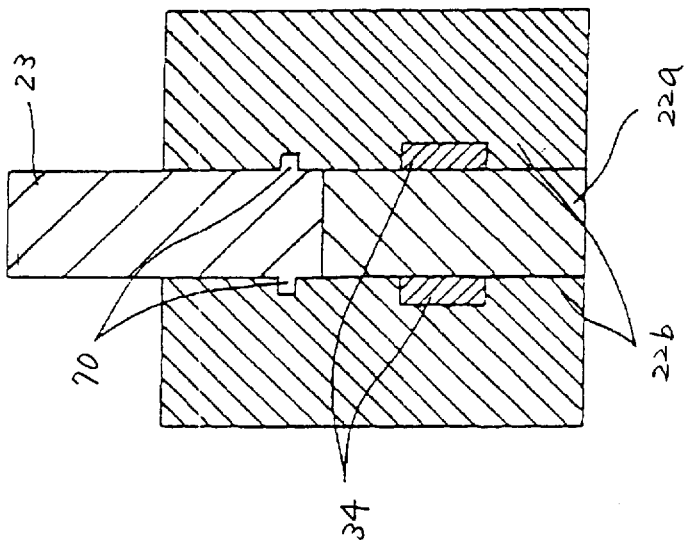

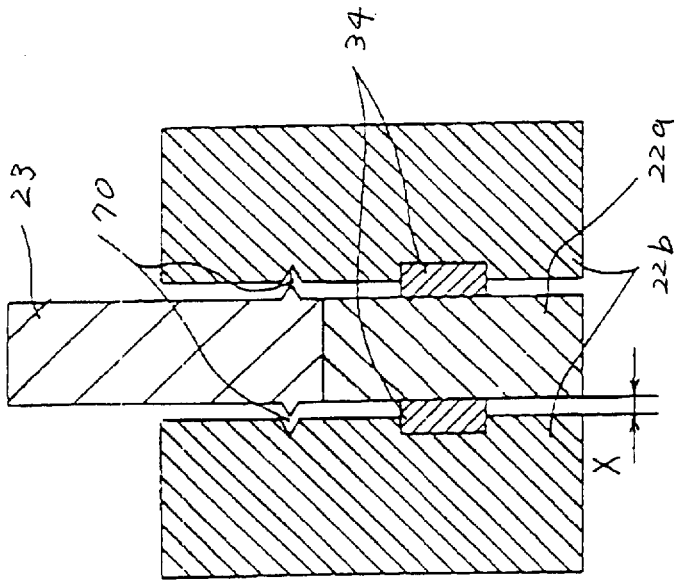
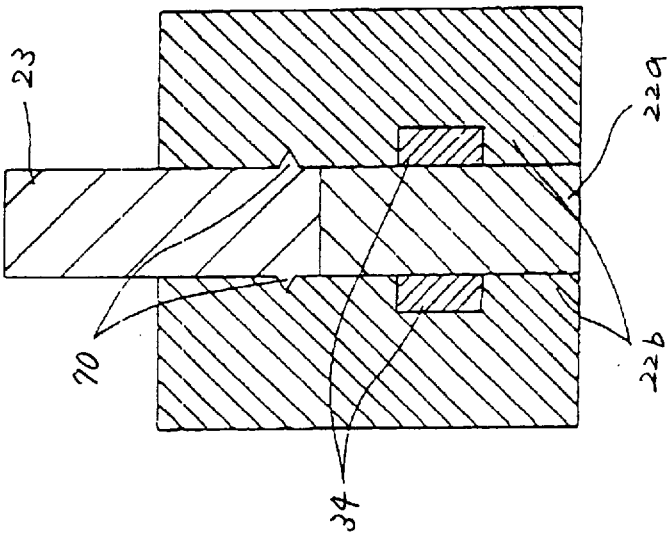

PLASTIC MOLDING APPARATUS AND METHOD

BACKGROUND OF THE INVENTION

FIELD OF THE INVENTION

The present invention relates to a plastic molding apparatus and method, and particularly relates to plastic molding apparatuses and methods for manufacturing a highly precise plastic molded product such as a plastic lens and a mirror having a mirror surface.

DISCUSSION OF THE BACKGROUND

A conventional manufacturing method for making a highly precise plastic molded product such as a plastic lens and a mirror is discussed in, for example, Japanese Laid Open Patent No. 1992-163119. In this method, after a plastic base material is processed to an almost final form by injection molding, the plastic base material is inserted into a pair of die, each having at least one cavity with at least one mirror surface. Then, this pair of die is heated to more than a glass transition temperature of the plastic base material and, as a result, a resin internal pressure is generated. Subsequently, the plastic base material is annealed and the mirror surface in the cavity is transferred to the plastic base material.

An apparatus for achieving such a manufacturing method is explained, for example, in Japanese Laid Open Patent No. 1993-220860 the contents of which is incorporated herein by reference and shown in FIG. 16.

In FIG. 16, a plastic base material 3, having thermoplasticity properties, is processed by injection molding in advance so that a characteristic form and capacity of the base material 3 are almost the same as those of a cavity, formed when an upper die 1 and a lower die 2 are clamped together, and into which the base material 3 is inserted.

The upper die 1 is arranged in a direction perpendicular, (a horizontal direction in FIG. 16) to a die clamping direction of the upper die 1 and the lower die 2 (a vertical direction in FIG. 16). The cavity is composed of a cavity forming portion 1a having a cavity forming surface and a cavity side board portion 1b having a cavity forming surface which is adjacent to the cavity forming portion 1a and surrounds the cavity forming surface of the cavity forming portion 1a. The cavity forming portion 1a and the cavity side board portion 1b are formed in one body.

Further, the lower die 2 is composed of plural cavity forming portions 2a and cavity side board portions 2b respectively arranged in the direction perpendicular to the die clamping direction.

Outside the upper die 1 and the lower die 2, die temperature adjusting blocks 7 and 8 are positioned for adjusting the dies 1 and 2 and are provided with heaters 7a and 8a for heating the blocks 7, 8 and coolers 7b and 8b for cooling the blocks 7, 8. The heaters 7a, 8a and coolers 7b, 8b are installed in the blocks 7, 8 as shown. The die temperature adjusting blocks 7 and 8, are held by die plates 11 and 12 of upper and lower sides by way of heat insulation boards 9 and 10.

Further, on both sides of the lower die 2, a die clamping structure 13 is installed so as to clamp the cavity forming portion 2a and the cavity side board portion 2b in a direction perpendicular (or lateral) to the die clamping direction. The die clamping structure 13 employs hydraulic pressure, air pressure, or electric motor etc. to exert the necessary clamping force.

Between the respective cavity forming portions 2a and the cavity side board portions 2b, a compression spring 15 is mounted. This compression spring 15 compresses when the cavity forming portion 2a and the cavity side board portion 2b are clamped by the die clamping structure 13. The compression spring 15 maintains the cavity together with the cavity forming portion 2a and the cavity side board portion 2b. When the clamping force of the die clamping structure 13 is released, an air space is formed by a resiliency action of the spring 15 moving the cavity forming portion 2a with respect to the cavity side board portion 2b.

In such a plastic molding apparatus, after the plastic base material 3 is pre-processed and is inserted into the cavity when the upper die 1 and the lower die 2 are opened. The upper die 1 and the lower die 2 are subsequently clamped from both sides by a predetermined force of the die clamping structure 13. Then, the upper and lower dies are clamped in the die clamping direction (vertical direction as shown) by a predetermined force of a press machine, not shown in FIG. 16. At this time, the compression spring 15 compresses so as to preserve the proper form of the cavity and prevent a burr from being formed on the base material 3 during molding.

Next, after heat treatment, the temperature of the base material 3 is lowered to be less than the heat deformation temperature. The dies are then opened, and the clamping force of the die clamping structure 13 is released. Upon release of the die clamping structure 13, the resiliency of the compression spring 15 takes effect, and an air space is formed between the cavity forming portion 2a and the cavity side board portion 2b, and a final molded product is exfoliated and removed from the lower die 2.

However, as recognized by the present inventor, in such a conventional plastic molding apparatus, by heat melting at more than the glass transition temperature of the die and the plastic base material, a resin internal pressure is generated and creates a strong attaching force between the molded resin and the wall surface of the cavity. Therefore, when the clamping force of the die clamping structure 13 is released, the resiliency of the compression spring 15 takes effect and causes the formation of the air space between the cavity forming portion 2a and the cavity side board portion 2b. However, if a fine difference between the attaching force of the surface of the molded product 3 and the surface of the cavity side board portion 2b at a left side and that of the surface of the molded product 3 and the surface of the cavity side board portion 2b at a right side, or a fine timing error is present when separating the left and right sides, even if the compression spring 15 having a stronger resiliency is used, the molded product 3 slips on the cavity forming portion 2b as shown by an arrow in FIG. 17. Thus, when one of the side surfaces of the molded product 3 continues to stay attached to one of the surfaces of the cavity side board portion 2b where the attaching force is stronger, or the timing error when the cavity side board portion 2b moves is present, a problem occurs in separating the molded product 3 from the die.

Further, even if the die separation is achieved, since the die separation resistance increases, the shape of the molded product 3 becomes distorted and a problem of reduced product precision materializes.

Accordingly, in order not to cause such a problem, it is necessary that the attaching forces, and separation timing, of the both side surfaces of the molded product 3 with respect to the cavity side board portion 2b must be precisely the same as one another, however, as a practical matter, such mechanical certainty is difficult to achieve.

Further, in the conventional plastic molding apparatus, when the die is opened in the vertical direction, a problem arises in that the molded product 3 is pulled to the upper die 1 and remains affixed thereto in accordance with a form of the molded product 3. Moreover, even if the molded product 3 is not pulled to the upper die 1, when the die is opened in the vertical direction, since the molded product 3 is pulled toward the upper die 1, there occurs a problem in that a final precision of the shape of the molded product is reduced.

SUMMARY OF THE INVENTION

Accordingly, one object of the present invention is to resolve the above-identified problems and to provide a plastic molding apparatus and method in which a molded product is easily separated from a die when the molded product is removed therefrom, and deformation of the molded product and reduced surface precision thereof are prevented when the molded product is separated from the die.

Another object of the present invention is to provide a plastic molding apparatus and method in which a molded product is prevented from becoming attached to one of the cavity side board portions when the clamping force on a cavity forming portion and the cavity side board portion is released, so that the molded product is easily separated from a die when the molded product is removed therefrom, and deformation of the molded product and reduced surface precision thereof are prevented when the molded product is separated from the die.

Another object of the present invention is to provide a plastic molding apparatus and method in which a molded product is fixed to a lower die and is prevented from being pulled to an upper die when the die is opened in a vertical direction, and thereby the molded product is easily separated from a die when the molded product is removed, and deformation of the molded product and reduced surface precision thereof are prevented when the molded product is separated from the die.

These and other objects and advantages are achieved by the present inventive method and plastic molding apparatus which has a pair of dies including at least one cavity with at least one mirror surface. A plastic base material, which is molded in advance by injection molding so that a form and capacity thereof are almost, if not the, same as those of the cavity, is inserted into the pair of die and clamped in place. Then, the plastic base material is heated and melted at a glass transition temperature, or higher so that a resin internal pressure is generated in the cavity. The plastic base material is then annealed, and the mirror surface in the cavity is transferred to the plastic base material. A separation die is included in one of the pair of die and is arranged to move in a direction perpendicular to a die clamping direction in which the dies contact each other. Each cavity is formed by a cavity forming portion that has a cavity forming surface crossing the die clamping direction and a cavity side board portion that is adjacent to the cavity forming portion and surrounds the cavity forming surface. A die clamping structure clamps the separation die from both sides in a direction almost perpendicular (if not exactly perpendicular) to the die clamping direction. An elastic member is mounted between the cavity forming portion and the cavity side board portion in the separation die. The elastic member is compressed when clamping is conducted by the die clamping structure and holds the proper cavity form. When the clamping pressure is released, the cavity forming portion and the cavity side board portion separate as a result of the resiliency of the elastic member. An engagement portion is included and formed at both edge portions of the cavity forming portion which contacts the cavity side board portion and engage the plastic base material.

BRIEF DESCRIPTION OF THE DRAWINGS

In describing the preferred embodiments of the present invention illustrated in the drawings, specified terminology is employed for the sake of clarity. However, the invention is not intended to be limited to the specific terminology so selected, and it is to be understood that each specific element includes all technical equivalents which operate in a similar manner.

A more complete appreciation of the present invention and many of the attendant advantages thereof will be readily obtained as the same becomes better understood by reference to the following detailed description, particularly when considered in connection with the accompanying drawings, wherein:

FIGS. 14(a) and 14(b) are views showing an undercut formed in a cavity surface of a cavity side board portion;

FIGS. 15(a) and 15(b) are views showing that the undercut is formed in taper shape;

DESCRIPTION OF THE PREFERRED EMBODIMENTS

Figure 1:
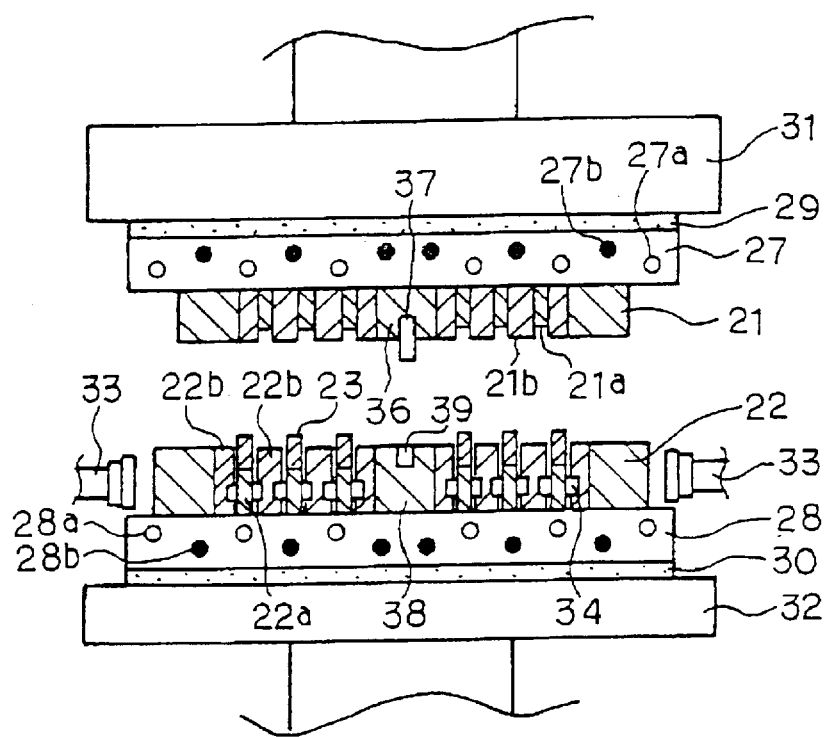
FIG. 1 is a section view of a structure showing a first embodiment of a plastic molding apparatus of the present invention.

Referring now to FIGS. 1 to 9(a) and 9(b), a first embodiment of the present invention is described.

First, a structure will be described, in reference to FIGS. 1 and 2, where numeral 21 identifies an upper die and numeral 22 identifies a lower die. Within a cavity of the upper die 21 and lower die 22, a plastic base material 23 having thermoplasticity properties and having a form and capacity that, as a result of an injection molding process, is similar to those of the cavity.

In the upper die 21, respective cavities are composed of a cavity forming portion 21a, arranged in a direction perpendicular to a die clamping direction (a vertical direction in FIG. 1), and a cavity side board portion 21b having a cavity forming surface that is adjacent to the cavity forming portion 21a and surrounds the cavity forming portion 21a as shown. The cavity forming portion 21a and the cavity side board portion 21b are formed in one body.

In the lower die 22, respective separation dies are arranged, with associated cavities. Each cavity is composed of a cavity forming portion 22a, with an upper surface arranged in the direction perpendicular to the die clamping direction, and a cavity side board portion 22b also has a cavity forming surface which is adjacent to the cavity forming portion 21a and surrounding them as shown. A mirror surface is formed on both (or alternatively either) of the cavity forming surfaces of the cavity forming portion 21a and 22a.

Outside the upper die 21 and the lower die 22, die temperature adjusting portions 27 and 28 are formed, which hold the upper die 21 and the lower die 22 and adjusts temperature of the die. These die temperature adjusting portions 27 and 28 have heaters 27a and 28a for heating and coolers 27b and 28b for cooling the die such that the die temperature can be rapidly adjusted by selecting and enabling the appropriate heaters 27a, 28a or coolers 27b, 28b. The die temperature adjusting portions 27 and 28 are held from outside by die plates 31 and 32 by way of heat insulating boards 29 and 30.

The upper and lower die plates 31 and 32 are connected to a press machine (not shown) that clamps together the upper die 21 and the lower die 22 in the die clamping direction (the vertical direction in the figure) by a predetermined pressure during molding.

A separating die clamping structure 33 clamps the lower die 22 in a direction perpendicular to the die clamping direction and is mounted on both sides of the lower die 22. This separating die clamping structure 33 supplies uniform clamping power by way of oil pressure, hydraulic pressure, air pressure, or electric motor (for example) which can be suitably selected in accordance with a form of a molded product, size of a die, or clamping power.

Further, respective compression springs 34 (an elastic member) are mounted between the cavity forming portion 22a and cavity side board portion 22b, and each compression spring 34 compresses when the cavity forming portion 22a and cavity side board portion 22b are clamped by the separating die clamping structure 33 so that the spring 34 retains the proper form of the cavity together with the cavity forming portion 22a and cavity side board portion 22b. When the separating die clamping structure 33 is released, an air space (i.e., gap) is formed between the cavity forming portion 22a and cavity side board portion 22b by action of the resiliency of the compression spring 34. Other elastic members such as rubber etc., may be used instead of the compression spring 34.

Figure 3:
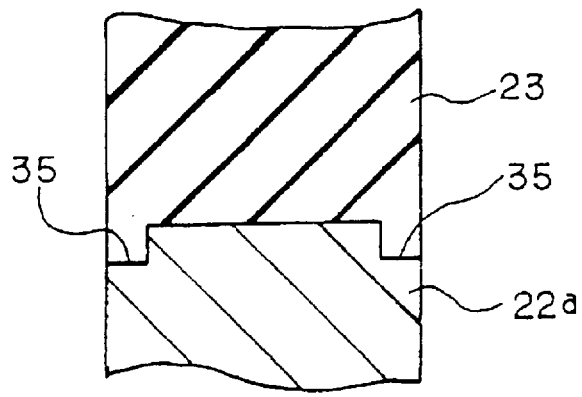
FIG. 3 is a section view showing a joint portion of a cavity forming portion and a plastic base material of the first embodiment.

A concavity 35, as shown in FIG. 3, is formed as an engagement portion, that engages the plastic base material 23, on both edges of the cavity forming portion 22a which contact the cavity side board portion 22b, and this concavity 35 extends into the cavity forming portion 22a in the same direction as the die clamping direction and also extends in a direction perpendicular thereto. For this embodiment as is shown in FIG. 4 shows a structure to be applied in molding a lengthy molded product, as is evident from the length of the cavity forming portion 22a.

Figure 4:
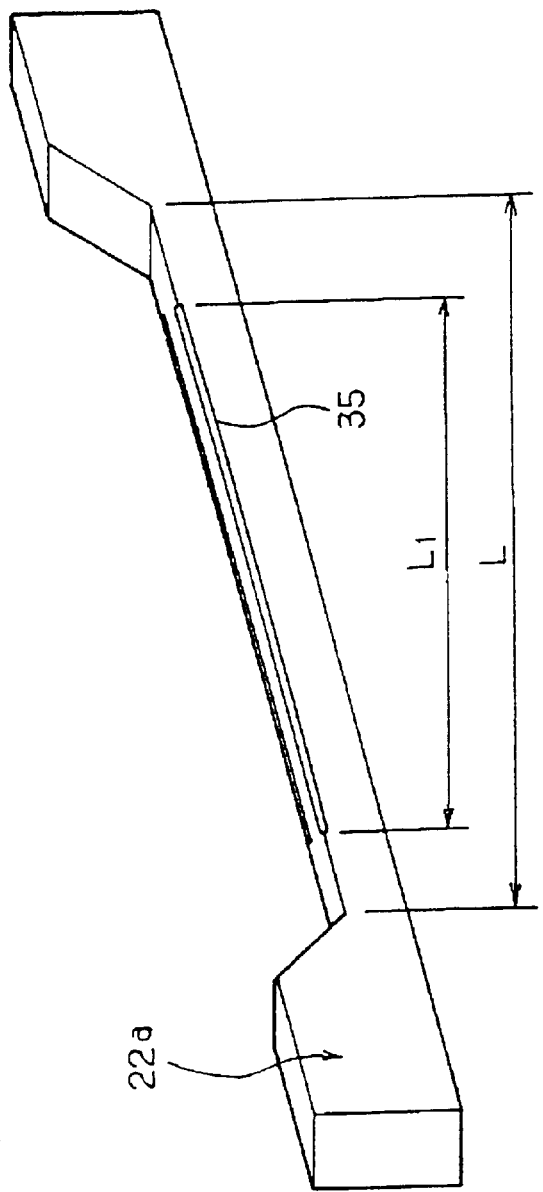
FIG. 4 is a perspective view showing the cavity forming portion of the first embodiment.

Further, as shown in FIG. 4, the concavity 35 is formed at 0.3 mm or more in height, and a length L1 in an extending direction being at ½ or more of a cavity forming surface L of the cavity forming portion 22a, and a surface roughness is formed at Ra=0.1 µm or less.

Figure 2:
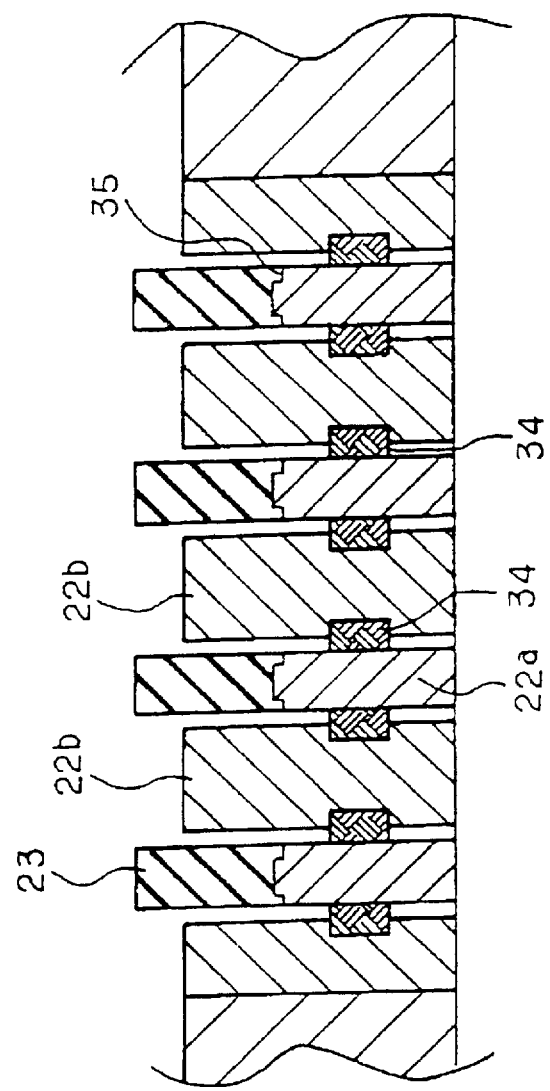
FIG. 2 is a section view showing a separation die of the first embodiment.

In FIG. 1, numeral 36 identifies a positioning die having a positioning pin 37 formed in a center of the upper die 21 and numeral 38 identifies a positioning die which has an insertion hole 39 into which the positioning pin 37 is inserted. When inserted, the upper die 21 and the lower die 22 are aligned when clamped together.

Next, an operation of the above-described plastic molding apparatus is described.

First, an injection molding process is conducted on a plastic using a die for injection molding having a capacity and form that is the same or nearly the same as those formed with the upper die 21 and the lower die 22. The preprocessed thermoplastic plastic base material is thus almost in a final form when inserted in the upper die 21 and lower die 22 for final processing.

In this embodiment, the injection molding process is conducted on this plastic base material as a temperature of the die for the injection molding is set to a heat deformation temperature of resin or less, and the plastic base material is subsequently cooled and solidified. Therefore, time for injecting and filling is greatly shortened, however, internal distortion and residual stress within the resin exists and also a density difference is caused by molecular orientation.

Thus, by further conducting the aging process using the upper die 21 and the lower die 22 of this embodiment, it is necessary to finally mold the plastic base material which is obtained by the injection molding process described above. To this end, the upper die 21 and the lower die 22 are opened in the vertical direction, and the plastic base material 23, having thermoplasticity properties and having been preprocessed, is inserted therebetween. At this time, because the air space between the cavity forming portion 22a and the cavity side board portion 22b is formed by the resiliency of the compression spring 24, the plastic base material 23 can be inserted easily.

Next, by using the separating die clamping structure 33, the cavity forming portion 22a and the cavity side board portion 22b in the lower die 22 are clamped at the predetermined pressure. Thus, the compression spring 15 is compressed, and thereby the proper cavity shape is formed and held so that generation of a burr on the plastic base material 23 is prevented during molding.

Next, the die is clamped in the clamping direction at the predetermined pressure by using the press machine (die clamping structure). The upper die 21 and the lower die 22 are then heated using the heaters 27a and 28a so that the plastic base material 23 is heated to a transition temperature, or more, and an internal pressure is generated by a melting expansion of the resin in the cavity. Then transferring is conducted by pressing the plastic base material 23 to the mirror surface formed in the cavity. Then, an aging process is conducted so as to remove the internal distortion, the residual stress and the molecular orientation of the plastic base material 23. Subsequently, the upper die 21 and the lower die 22 are annealed by the coolers 27b and 28b by making a temperature difference between an internal temperature of the plastic base material and a surface temperature thereof minimum so as not to generate the internal distortion, the residual stress, and the molecular orientation. Then, the upper die 21 and the lower die 22 are opened at a temperature at which the internal pressure of the cavity is consistent with the atmospheric pressure (1 kgf/cm$^2$) and the resin temperature becomes the heat deformation temperature or less.

Next, the lateral clamping force of the separating die clamping structure 33 is released, causing the resiliency of the compression spring 34 to form the air space between the cavity forming portion 22a and the cavity side board portion 22b so that the final molded product 23 can be exfoliated and removed from the lower die 22. Further, at this time, because the molded product 23 is engaged with the concavity 35, the molded product 23 is fixed to the cavity forming portion 22a and does not move to one of the adjoining cavity side board portions 22b.

Moreover, because the concavity 35 with which the molded product 23 is engaged is formed at the both edges of the cavity forming portion 22a, when the cavity forming portion 22a and the cavity side board portion 22b are separated by the resiliency of the compression spring 34, the molded product 23 can be engaged with the concavity 35 of the cavity forming portion 22a and the molded product 23 is prevented from slipping on the cavity forming portion 22a and attaching to one of the adjoining cavity side board portions 22b.

As a result, when the molded product 23 is removed, it can be easily separated from the die, and the deformation of the molded product 23 and the reduction of the surface precision which are caused when it is separated from the die is prevented.

Moreover, since the height of the concavity is formed at 0.3 mm or more and the length L1 in the extension direction of the concavity 35 is formed ½ times or more as long as the cavity forming surface L of the cavity forming portion 22a, the molded product 23 can be surely engaged with the concavity 35 and the molded product 23 is surely prevented from slipping on the cavity forming portion 22a.

Moreover, since the surface roughness of the concavity 35 is made Ra=0.1 μm or less, when the molded product 23 is removed, the molded product 23 can be prevented from attaching to the concavity 35 strongly and thereby it can be easily separated from the die. Further, the deformation of the molded product 23 and the reduction of the surface precision which are caused when the molded product 23 is separated from the die is prevented.

Figure 5:
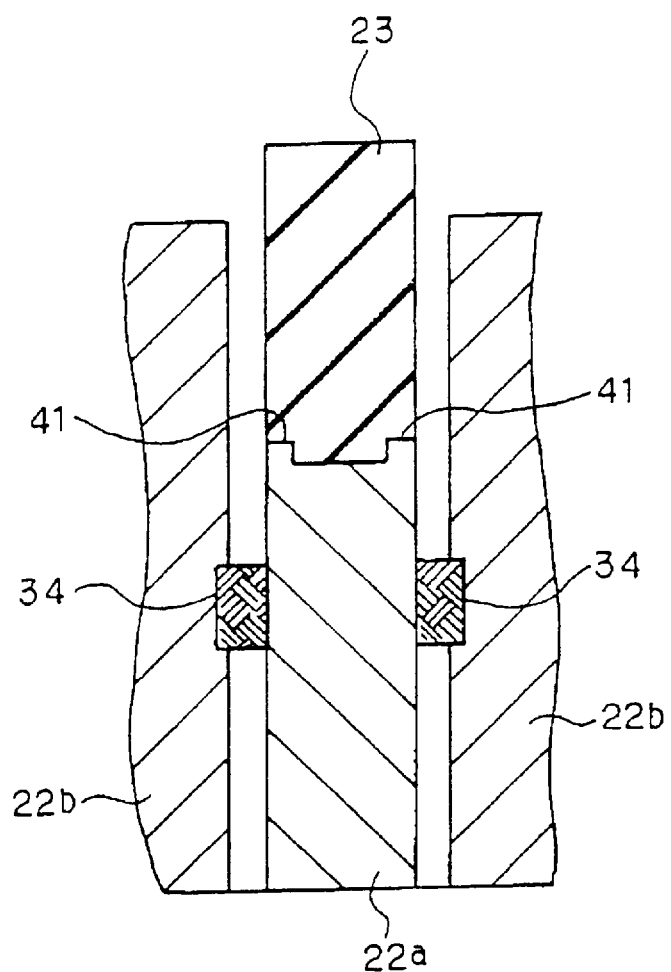
FIG. 5 is a view showing another example of the cavity forming portion of the first embodiment.

The concavity 35 is formed in this embodiment, however, it is not limited to the shape shown. Rather, a convex 41, or similar projection, may be formed, as shown in FIG. 5. In this case also, the height of the convex is formed at 0.3 mm or more and the length L1 in the extension direction of the convex 41 is formed ½ times or more as long as the cavity forming surface L of the cavity forming portion 22a, and the surface roughness of the convex 41 is made Ra=0.1 μm or less.

Figure 6:
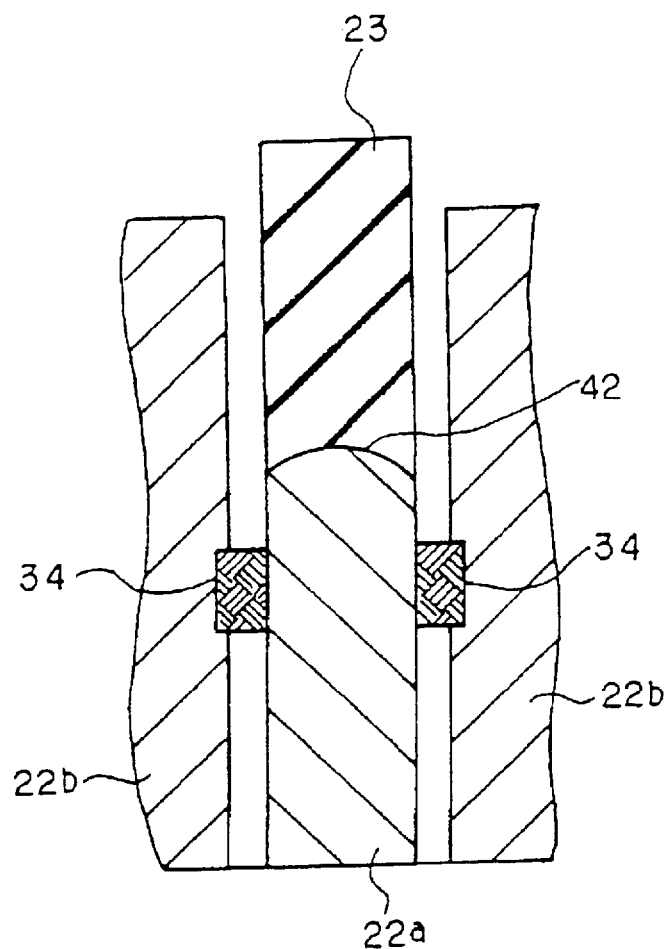
FIG. 6 is a view showing another example of the cavity forming portion of the first embodiment.
Figure 7:
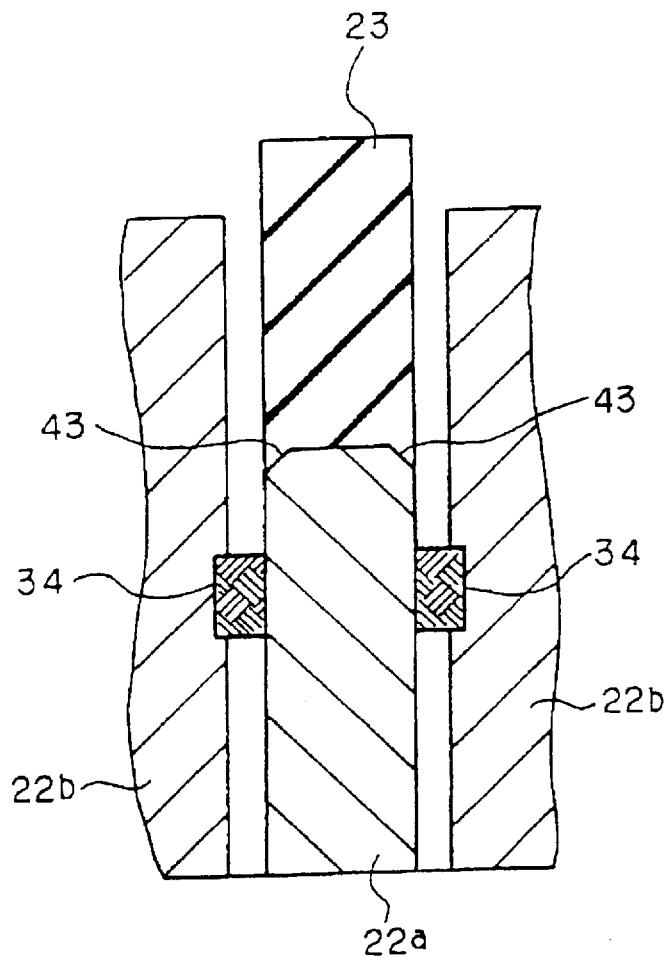
FIG. 7 is a view showing another example of the cavity forming portion of the first embodiment.

The concavity 35 (or depression) or the convex 41 (or projection) may be replaced by, or augmented with, as shown in FIG. 6, a curve 42 formed at the both edges of the cavity forming portion 22a. In this case, if a height from a bottom of the cavity forming portion 22a is formed at 0.3 mm or more, the same effect as the embodiment described above is achieved.

Moreover, when the concavity 35 or the convex 41 are also not formed due to limitation of the form of the molded product 23, if a C-filleting portion 43 which is engaged with the plastic base material 23 is formed at the both edges of the cavity forming portion 22a, the same effect as the embodiment described above can be also achieved. In this case also, the height of 0.3 mm or more and the length L1 in the extension direction of the C-filleting portion 43 is formed ½ times or more as long as the cavity forming surface L of the cavity forming portion 22a, and further the surface roughness is made to be Ra=0.1 μm or less.

Figure 8:
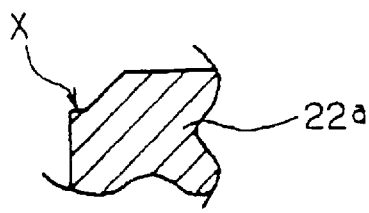
FIG. 8 is a view showing how a corner is filleted before a C-filleting portion is formed.
Figure 9:
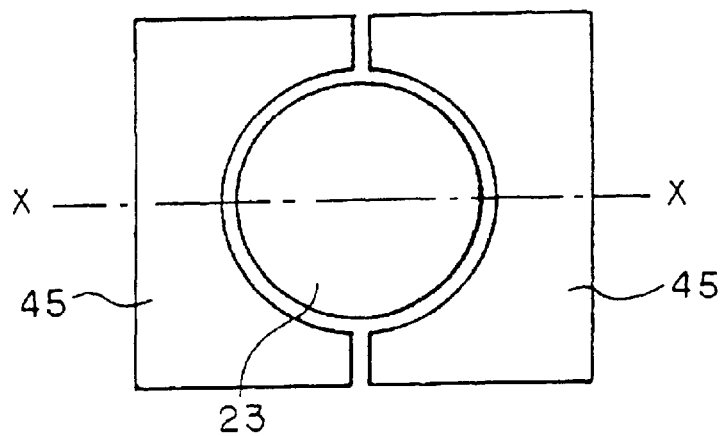
FIG. 9(a) is a plan view showing another example of the cavity forming portion and the cavity side board portion of the first embodiment.
FIG. 9(b) is X—X section view of FIG. 9(a)
Figure 9:
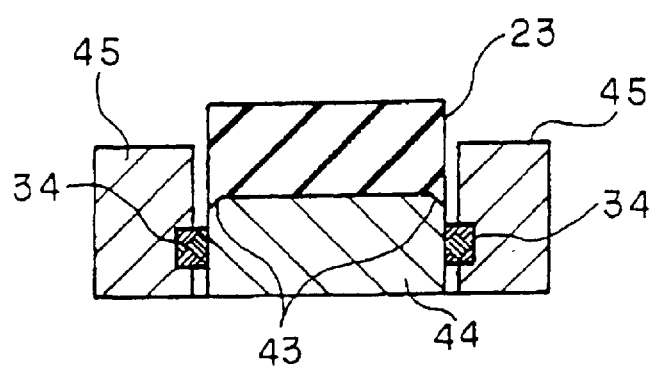

When the C-filleting portion 43 is formed, as shown in FIG. 8, if the C-filleting process is conducted, after filleting a corner, so that a bottom surface of the filleting portion is flat as shown by X in FIG. 8, the processing precision of the edge portions is high and generation of a burr or the molded plastic is prevented.

Further, in this embodiment, since there are the plural cavities, the concavity 35, the convex 41, the curve 42, or the C-filleting portion 43 may be combined in various arrangements most properly in accordance with the form of the molded product and may be formed on the both edges of the each cavity.

Moreover, this embodiment shows that the lengthy molded product 23 is molded by the lengthy cavity forming portions 21a and 22a. However, when a cylindrical molded product is molded, as shown in FIGS. 9a and 9b, a cylindrical cavity forming portion 44 is used and a cavity side board portion 45 is installed adjacent to this cavity forming portion 44 so as to surround the cavity forming portion 44.

Figure 10:
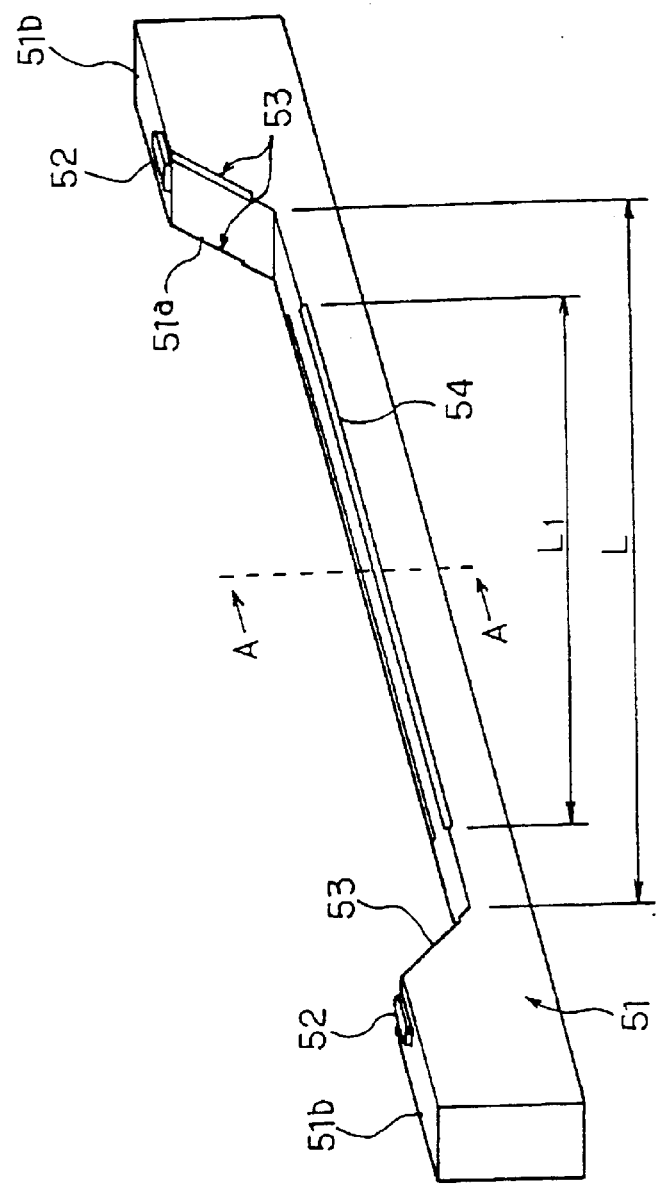
FIG. 10 is a section view of the structure showing a second embodiment of a plastic molding apparatus of the present invention and a perspective view of the cavity forming portion.
Figure 11:
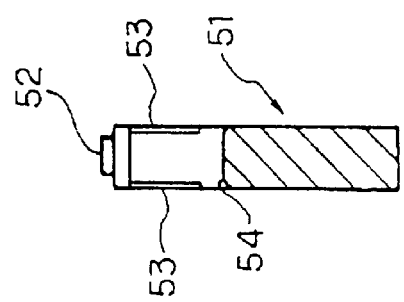
FIG. 11 is A—A arrow direction section view of the structure shown in FIG. 10.

Next, a second embodiment is described referring to FIGS. 10 and 11. In this embodiment, a position of the engagement portion is different from that of the first embodiment, however, the other structures are same as those of the first embodiment, and thus characteristic parts only are shown in the figures.

In this embodiment, a convex 52 (a projection) and a C-filleting portion 53 are formed in both edges in the extension direction outside the cavity forming surface L of the cavity forming portion 51 as an engagement portion with the plastic base material 23.

In this embodiment, an edge surface 51b which is formed in a higher position than the cavity forming surface L, is formed continuously to the cavity forming surface L of the cavity forming portion 51 by way of a taper surface 51a, and the C-filleting portion 53 is formed in the both edges 51b, and the convex 52 is formed therein. Numeral 54 also identifies the C-filleting portion.

By such a structure, the same effect as the first embodiment can be also obtained. Further, in this embodiment, since the convex 52 or the C-filleting portion 53 are formed in the both edges in the extension direction of the cavity forming portion, when a molded product which is deformed easily, such as a lengthy product or a thin product etc., is molded, the deformation of the molded product can be prevented.

Further, though it is not shown in the figures, a concavity or a convex which has a height difference to the cavity forming surface L is formed in both edges in the extension direction of the cavity forming portion, so as to achieve the same effect as the first embodiment.

Figure 12:
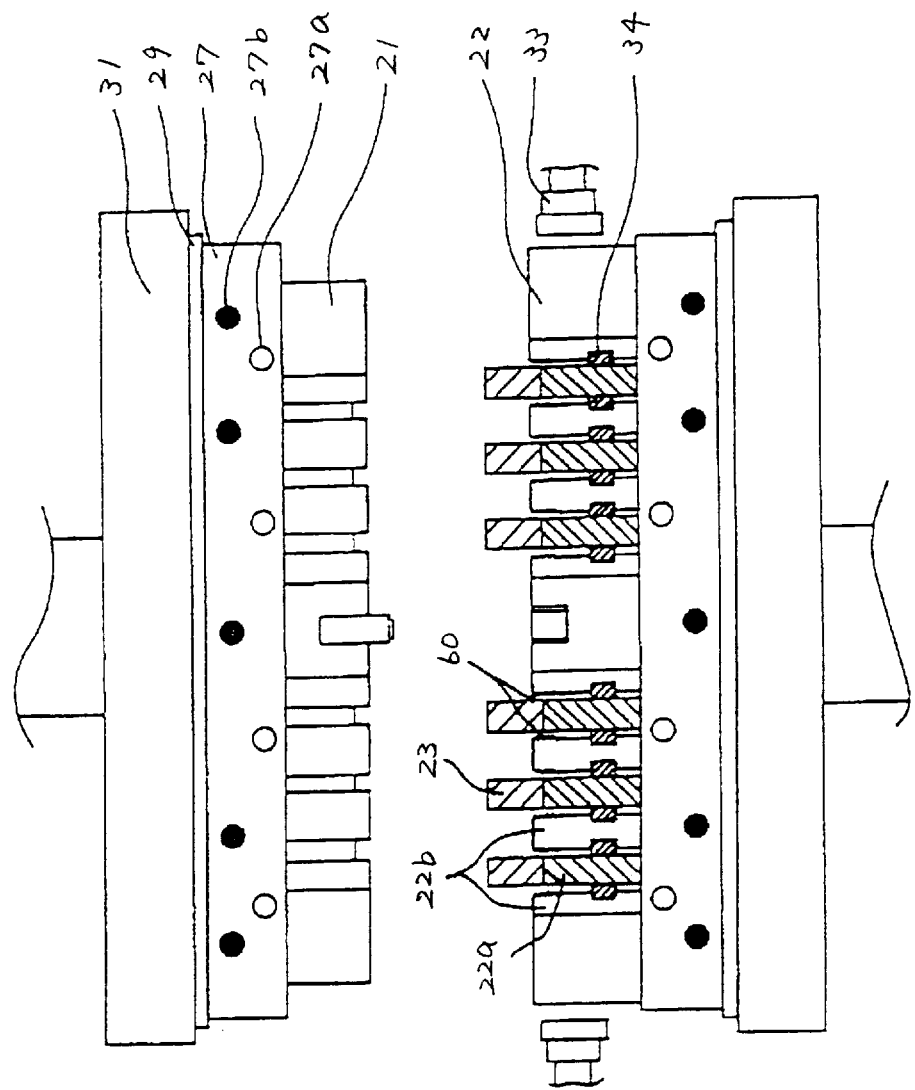
FIG. 12 is a section view of the structure showing a third embodiment of a plastic molding apparatus of the present invention.
Figure 13A:
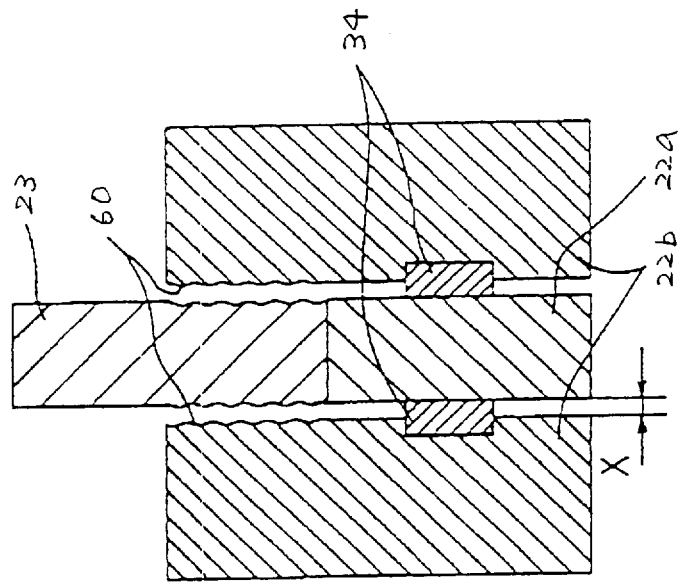
FIGS. 13(a) and 13(b) are views showing a roughness of a contact surface between a cavity forming portion and a cavity side board portion.
Figure 13B:
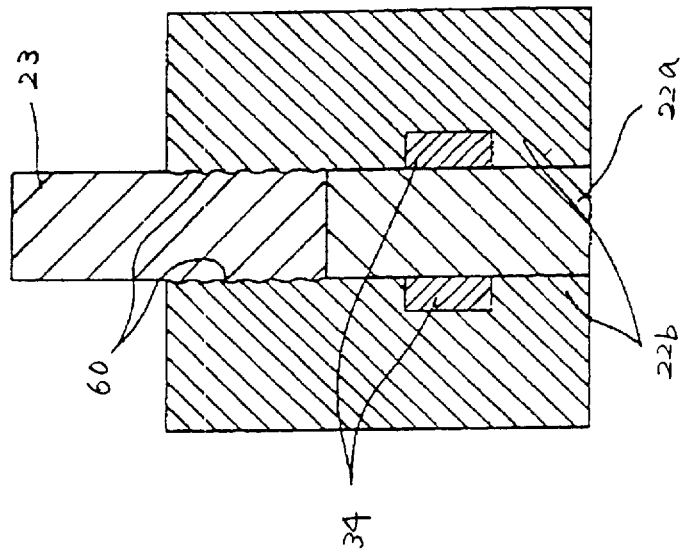
Figure 16:
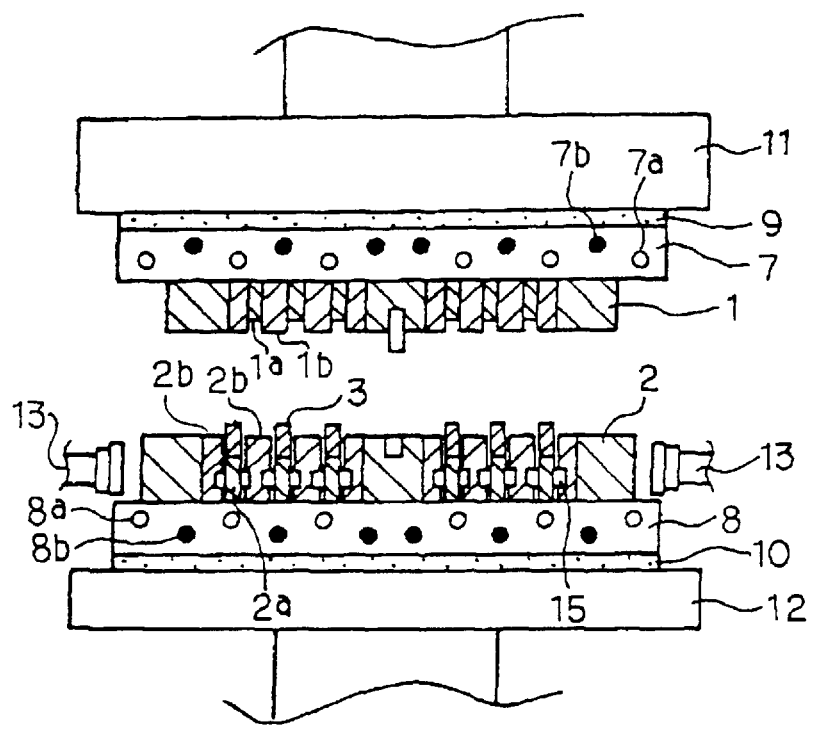
FIG. 16 is a section view showing a plastic molding apparatus according to the prior art.
Figure 17:
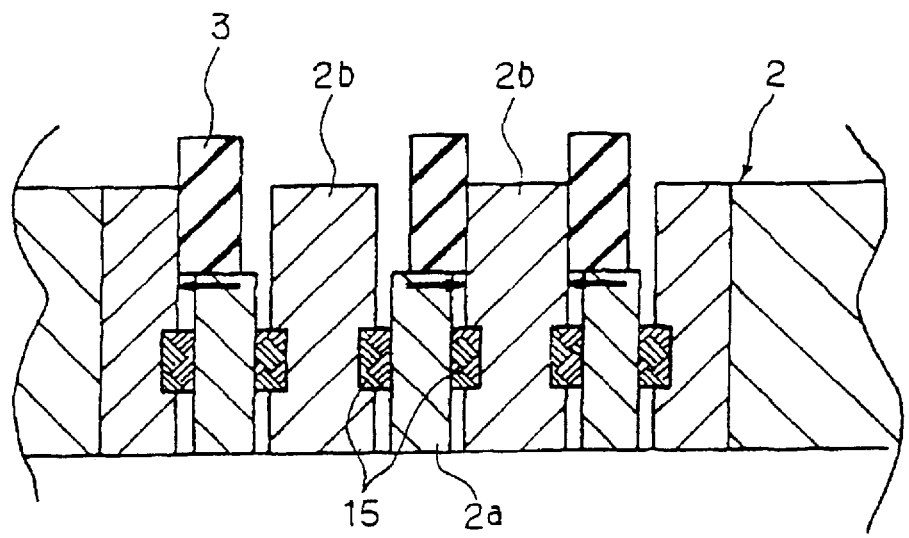
FIG. 17 is a section view showing a state of separation of die in the plastic molding apparatus of the prior art when a die clamping structure in a lower die is released.

Next, a third embodiment will be described referring to FIGS. 12 and 13(a) to 15(b). The same elements as the first embodiment in FIG. 1 are indicated by the same numerals, and the description of these elements is omitted. As shown in FIGS. 12 and 13(a) and 13(b), in this embodiment, a surface roughness of a cavity surface 60 of the cavity side board portion 22b of the lower die 22 is made rough. Thereby, when the die is opened in the vertical direction, the molded product 23 is pulled to the lower die 22 by the rough surface, even if the molded product 23 is not pulled by the upper die 21 and does not remain therein, a problem can be prevented that the molded product 23 is pulled to the upper die 21 and thus the molded product is deformed and final precision thereof is reduced.

In this embodiment, when the molded product is removed, since the space between the cavity forming portion 22a and the cavity side board portion 22b is formed, when the molded product 23 is removed from the lower die 22, the rough surface described above does not resist separation and the molded product 23 can be removed easily.

Further, the surface roughness of the cavity surface of the cavity side board portion of the lower die 22 is made rougher than that of the upper die 21, and thereby the molded product 23 can be pulled to the lower die 22 more surely and the molded product 23 is prevented from being pulled to the upper die 21.

Moreover, as shown in FIGS. 13a and 13b, the surface roughness of the cavity surface 60 is made smaller than the separation amount X between the cavity forming portion 22a and the cavity side board portion 22b which is formed when the die clamping structure 33 is released, and thereby the molded product 23 can be removed easily without being deforming.

Further, as shown in FIGS. 14a and 14b, by forming an undercut 70 on the cavity surface of the cavity side board portion 22b, the same effect can be also obtained. In this case, the height of the undercut 70 is made smaller than the separation amount X between the cavity forming portion 22a and the cavity side board portion 22b which is formed when the die clamping structure 33 is released. Accordingly, when the molded product 23 is removed from the lower die 22, the molded product 23 is not caught by the undercut and namely the undercut does not resist die separation, and thus the molded product 23 can be removed easily without being deforming.

Moreover, as shown in FIGS. 15a and 15b, by forming the undercut 70 in a taper shape, when the die clamping structure 33 is released and the cavity forming portion 22a is separated from the cavity side board portion 22b by the elastic member 34, the undercut 70 does not resist separation, and the cavity forming portion 22a can be separated from the cavity side board portion 22b surely and the molded product 23 can be removed easily without being deforming.

Further, with respect to the surface roughness of the undercut 70, numerical value data of the surface roughness is compared between when the cavity forming portion 22a is separated from the cavity side board portion 22b and when the cavity forming portion 22a is not separated from the cavity side board portion 22b, and as a result, when Ra≦1 μm, the cavity forming portion 22a is separated from the cavity side board portion 22b, and when Ra>1 μm, the cavity forming portion 22a is not separated from the cavity side board portion 22b. Thus, by setting the surface roughness at 1 μm or less, the cavity forming portion 22a can be more surely separated from the cavity side board portion 22b.

The technical advantages of the present invention described.

According to the present invention, when the clamping force on the cavity forming portion and the cavity side board portion by the separating die clamping structure is released, and the cavity forming portion is separated from the cavity side board portion by the resiliency action of the elastic member, the molded product remains engaged with the engagement portion of the cavity forming portion. Thus, the molded product is prevented from slipping on the cavity forming portion and attaching to one of the adjoining cavity side board portions. As a result, when the molded product is removed, it can be easily separated from the die, and the deformation of the molded product and the reduction of the surface precision, which are caused when it is separated from the die, is prevented.

According to the present invention, when the molded product is removed, the molded product can be prevented from strongly adhering to the concavity so as to be easily separated from the die, and further the deformation of the molded product and the reduction of the surface precision which are caused when the product is separated from the die is prevented.

According to the present invention, since the engagement portion is formed in both edges of the extension direction of the cavity forming portion, when the molded product which is deformed easily, particularly when formed as a lengthy product or a thin product etc., is molded, the deformation of the molded product is prevented.

According to the present invention, the surface roughness of the cavity surface of the cavity side board portion of the lower die is made rough, and thus when the die is opened in the vertical direction, the molded product is pulled to the lower die by the rough surface, even if the molded product is not pulled by the upper die and does not remain therein. Consequently, the problem that the molded product is pulled to the upper die and thus the molded product is deformed and final precision thereof, is prevented.

According to the present invention, when the molded product is separated from the die, the rough surface or the undercut portions formed on the cavity surface of the cavity side board portion do not become resist die separation, and thus the molded product can be removed easily without being deformed. By forming the undercut in a taper shape or setting the surface a roughness thereof to be Ra=1 μm or less, when the die clamping structure is released and the cavity forming portion is separated from the cavity side board portion by the elastic member, the undercut no longer resists separation, and the cavity forming portion can be surely separated from the cavity side board portion.

Obviously, numerous modifications and variations of the present invention are possible in light of the above teachings. It is therefore to be understood that, within the scope of the appended claims the invention may be practiced otherwise than as specifically described herein.

The present application contains subject matter disclosed in Japanese documents 1996-294688 and 1997-057428, to which the present application claims priority, and the contents of which are incorporated herein by reference.

What is claimed as new and desired to be secured by Letters Patent of the United States is:

1. A plastic molding apparatus for molding a plastic base material, comprising:
   a first die having,
      a first side, and
      a second side configured to receive a main clamping force along a main clamping direction;
   a second die having,
      a first side with a cavity having a mirror surface formed therein, said first side opposing said first side of said first die;

a second side that receives the main clamping force such that said first die and said second die clamp said plastic base material therebetween when said main clamping force is applied to said first die and said second die, said second die comprising, a separation die including,
- a cavity forming portion having a cavity forming surface with edge portions having engagement portions that engage said plastic base material, said cavity forming portion positioned to generally face said first side of said first die,
- a cavity side board portion being adjacent to the cavity forming portion, and
- an elastic member mounted between the cavity forming portion and the cavity side board portion, and
- a controllable die clamping mechanism disposed at third and fourth sides of said second die and configured to exert a lateral clamping force to said third and fourth sides that is generally oriented perpendicular to the main clamping direction, wherein
  - said lateral clamping force compresses said elastic portion and urges said cavity side board portion to contact said edge portions of said cavity forming portion so as to maintain a predetermined shape of said cavity when subject to said lateral clamping force, and
  - said elastic portion separating said cavity forming portion and the cavity side board portion as a result of a resiliency action therefrom when said lateral clamping force is released.

2. The apparatus of claim 1, wherein,
said cavity has a size and shape that generally matches that of said plastic base material before said plastic base material is clamped between said first die and said second die;
said first die being configured to release said plastic base material when said main clamping force is removed from the first die and the second die after said plastic base material has been heated and melted therein at a temperature that is at least at a glass transition temperature, and after being annealed so that a mirror surface is transferred to the plastic base material.

3. The plastic molding apparatus of claim 1, wherein:
respective of said engagement portions comprise a step portion which is extended in the main clamping direction by a predetermined amount and extends along said edge portion for a predetermined length in a direction that is generally perpendicular to a direction of said lateral clamping force.

4. The plastic molding apparatus of claim 3, wherein a height of the step is at least 0.3 mm.

5. The plastic molding apparatus of claim 3, wherein the predetermined length of said step being is at least ½ as long as the cavity forming surface of the cavity forming portion.

6. The plastic molding apparatus of claim 3, wherein a surface roughness of the step is Ra=0.1 μm or less.

7. The plastic molding apparatus of claim 1, wherein respective engagement portions comprise C-filleting portions that extend in the main clamping direction and extend for a predetermined length in a direction generally perpendicular to a direction of said lateral clamping force.

8. The plastic molding apparatus of claim 7, wherein a height of the C-filleting portion is 0.3 mm or more.

9. The plastic molding apparatus of claim 7, wherein the predetermined length of the C-filleting portion is at least ½ as long as the cavity forming surface of the cavity forming portion.

10. The plastic molding apparatus of claim 7, wherein a surface roughness of the C-filleting portion is Ra=0.1 μm or less.

11. The plastic molding apparatus of claim 1, wherein the engagement portion comprises a curved portion that extends by a predetermined amount in the main clamping direction and extends for a predetermined length in the direction generally perpendicular to a direction of said lateral clamping force.

12. The plastic molding apparatus of claim 11, wherein a height of the curved portion is 0.3 mm or more.

13. A plastic molding apparatus for molding a plastic base material, comprising:
- a first die having,
  - a first side, and
  - a second side configured to receive a main clamping force along a main clamping direction;
- a second die having,
  - a first side with a cavity having a mirror surface formed therein, said first side opposing said first side of said first die;
  - a second side that receives the main clamping force such that said first die and said second die clamp said plastic base material therebetween when said main clamping force is applied to said first die and said second die, said second die comprising, a separation die including,
    - a cavity forming portion having a cavity forming surface with edge portions having engagement portions formed thereon, said engagement portions positioned to engage said plastic base material and oriented in an extension direction of said cavity forming position, said cavity forming portion positioned to generally face said first side of said first die,
    - a cavity side board portion being adjacent to the cavity forming portion, and
    - an elastic member mounted between the cavity forming portion and the cavity side board portion, and
    - a controllable die clamping mechanism disposed at third and fourth sides of said second die and configured to exert a lateral clamping force to said third and fourth sides that is generally oriented perpendicular to the main clamping direction, wherein
  - said lateral clamping force compresses said elastic portion and urges said cavity side board portion to contact said edge portions of said cavity forming portion so as to maintain a predetermined shape of said cavity when subject to said lateral clamping force, and
  - said elastic portion separating said cavity forming portion and the cavity side board portion as a result of a resiliency action therefrom when said lateral clamping force is released.

14. The plastic molding apparatus of claim 13, wherein respective engagement portions comprise a projection that projects from the cavity forming portion.

15. The plastic molding apparatus of claim 13, wherein respective engagement portions comprise a step having a height difference with respect to the cavity forming surface.

16. The plastic molding apparatus of claim 13, wherein the engagement portion comprises a C-filleting portion.

17. A plastic molding apparatus for molding a plastic base material, comprising:
- a first die having,
  - a first side, and
  - a second side configured to receive a main clamping force along a main clamping direction;
- a second die having,
  - a first side with a cavity having a mirror surface formed therein, said first side opposing said first side of said first die;

a second side that receives the main clamping force such that said first die and said second die clamp said plastic base material therebetween when said main clamping force is applied to said first die and said second die, said second die comprising, a separation die including,
  a cavity forming portion having a cavity forming surface that engages said plastic base material and oriented to generally face said first side of said first die,
  a cavity side board portion being adjacent to the cavity forming portion and having a rough surface roughness, and
  an elastic member mounted between the cavity forming portion and the cavity side board portion, and
  a controllable die clamping mechanism disposed at third and fourth sides of said second die and configured to exert a lateral clamping force to said third and fourth sides that is generally oriented perpendicular to the main clamping direction, wherein
said lateral clamping force compresses said elastic portion and urges said cavity side board portion to contact said cavity forming portion so as to maintain a predetermined shape of said cavity when subject to said lateral clamping force, and
said elastic portion separating said cavity forming portion and the cavity side board portion as a result of a resiliency action therefrom when said lateral clamping force is released.

18. The plastic molding apparatus of claim 17, wherein:
said first die has a cavity formed in the first face having a cavity side board with a predetermined surface roughness; and
the surface roughness of the cavity side board portion of the second die is rougher than that of the cavity side board portion in the first die.

19. The plastic molding apparatus of claim 17, wherein the surface roughness of the cavity side board portion is less than a separation amount between the cavity forming portion and the cavity side board portion when the lateral clamping force is released.

20. The plastic molding apparatus of claim 17, wherein an undercut portion is formed on the cavity side board portion.

21. The plastic molding apparatus of claim 20, wherein a length of the undercut portion is smaller than the separation amount between the cavity forming portion and the cavity side board portion when the lateral clamping force is released.

22. The plastic molding apparatus of claim 20, wherein the undercut portion has a tapered shape.

23. The plastic molding apparatus of claim 20, wherein a surface roughness of the undercut portion is Ra=1.0 $\mu$m or less.

24. A method for molding a plastic base product from a plastic base material, comprising the steps of:
  placing a first portion of the plastic base material in a first die;
  placing a second portion of the plastic base material in a cavity of a second die having a mirror surface, said second portion of the plastic base material having a same general shape as said cavity, comprising
    engaging the plastic base material with engagement portions in edge portions of a cavity forming surface,
    separating the cavity forming surface from a cavity side board portion with an elastic member;
  forming the plastic base product by clamping the plastic base material between the first die and the second die, comprising
    positioning the cavity forming surface to oppose said first die,
    applying a main clamping force between the first die and the second die so that the plastic base material fully engages said mirror surface and said engagement portions, and
    applying lateral clamping force to said second die, comprising,
      compressing said elastic member, and
      moving said cavity side board portion against said edge portions of said cavity forming surface so as to define a shape and size of said cavity and a corresponding feature in said plastic base product; and
  removing the plastic base product from the first die and the second die, comprising,
    releasing the main clamping force and separating said first die from said second die and plastic base product while retaining said plastic base product in said second die,
    releasing said lateral clamping force, and
    separating said cavity forming surface from said cavity side board portion while retaining said plastic base product in engagement with said engagement portions.

25. The method of claim 24, wherein said step of placing a first portion comprises placing the first portion in a cavity of the first die.

26. The method of claim 24, further comprising the steps of:
  molding said plastic base material in an injection molding process to have a same general shape as said cavity of said second die; and
  processing the plastic base material when clamped between said first die and said second die, comprising
    heating and melting said plastic base material at a temperature that is at least at a glass transition temperature,
    generating a resin internal pressure, and
    annealing the plastic base material and transferring the mirror surface to the plastic base material.

27. The method of claim 24, wherein said engaging step comprises engaging said plastic base material with engagement portions, said engagement portions comprising at least one of a step portion, a C-filleting portion, and a projection portion.

28. A method for molding a plastic base product from a plastic base material, comprising the steps of:
  placing a first portion of the plastic base material in a first die;
  placing a second portion of the plastic base material in a cavity of a second die having a mirror surface, said second portion of the plastic base material having a same general shape as said cavity, comprising
    engaging the plastic base material with a cavity forming surface,
    separating the cavity forming surface from a cavity side board portion with an elastic member, said cavity side board portion having at least one of a roughened surface and an undercut;
  forming the plastic base product by clamping the plastic base material between the first die and the second die, comprising
    positioning the cavity forming surface to oppose said first die,
    applying a main clamping force between the first die and the second die so that the plastic base material fully engages said mirror surface and said cavity forming surface, and applying a lateral clamping force to said second die, comprising,
compressing said elastic member, and
moving said cavity side board portion against said edge portions of said cavity forming surface so as to define a shape and size of said cavity and a corresponding feature in said plastic base product; and
removing the plastic base product from the first die and the second die, comprising,
releasing the main clamping force,
separating said first die from said second die while retaining said plastic base product in said second die by engaging the plastic base material with the at least one of the roughened surface and undercut of the cavity side board portion,
releasing said lateral clamping force, and
separating said cavity forming surface from said cavity side board portion.

29. An apparatus for molding a plastic base product from a plastic base material, comprising:
means for placing a first portion of the plastic base material in a first die means;
means for placing a second portion of the plastic base material in a cavity of a second die means having a mirror surface, said second portion of the plastic base material having a same general shape as said cavity, comprising
means for engaging the plastic base material with engagement portion means in edge portions of a cavity forming surface,
means for separating the cavity forming surface from a cavity side board portion with an elastic means;
means for forming the plastic base product by clamping the plastic base material between the first die means and the second die means, comprising
means for positioning the cavity forming surface to oppose said first die means,
means for applying a main clamping force between the first die means and the second die means so that the plastic base material fully engages said mirror surface and said engagement portion means, and
means for applying a lateral clamping force to said second die means, comprising,
means for compressing said elastic means, and
means for moving said cavity side board portion against said edge portions of said cavity forming surface so as to define a shape and size of said cavity and a corresponding feature in said plastic base product; and
means for removing the plastic base product from the first die means and the second die means, comprising,
means for releasing the main clamping force and separating said first die means from said second die means and plastic base product while retaining said plastic base product in said second die means,
means for releasing said lateral clamping force, and
means for separating said cavity forming surface from said cavity side board portion while retaining said plastic base product in engagement with said engagement portion means.

30. The apparatus of claim 29, wherein said means for placing a first portion comprises means for placing the first portion in a cavity of the first die means.

31. The apparatus of claim 29, further comprising:
means for molding said plastic base material in an injection molding process to have a same general shape as said cavity of said second die means; and
means for processing the plastic base material when clamped between said first die means and said second die means, comprising
means for heating and melting said plastic base material at a temperature that is at least at a glass transition temperature,
means for generating a resin internal pressure, and
means for annealing the plastic base material and transferring the mirror surface to the plastic base material.

32. The apparatus of claim 29, wherein said means for engaging comprises means for engaging said plastic base material with engagement portion, said engagement portion means comprising at least one of a step portion, a C-filleting portion, and a projection portion.

33. An apparatus for molding a plastic base product from a plastic base material, comprising:
means for placing a first portion of the plastic base material in a first die means;
means for placing a second portion of the plastic base material in a cavity of a second die means having a mirror surface, said second portion of the plastic base material having a same general shape as said cavity, comprising
means for engaging the plastic base material with a cavity forming surface,
means for separating the cavity forming surface from a cavity side board portion with an elastic means, said cavity side board portion having at least one of a roughened surface and an undercut;
means for forming the plastic base product by clamping the plastic base material between the first die means and the second die means, comprising
means for positioning the cavity forming surface to oppose said first die means,
means for applying a main clamping force between the first die means and the second die means so that the plastic base material fully engages said mirror surface and said cavity forming surface, and
means for applying a lateral clamping force to said second die means, comprising,
means for compressing said elastic means, and
means for moving said cavity side board portion against said edge portions of said cavity forming surface so as to define a shape and size of said cavity and a corresponding feature in said plastic base product; and
means for removing the plastic base product from the first die means and the second die means, comprising,
means for releasing the main clamping force,
means for separating said first die means from said second die means while retaining said plastic base product in said second die means by engaging the plastic base material with the at least one of the roughened surface and undercut of the cavity side board portion,
means for releasing said lateral clamping force, and
means for separating said cavity forming surface from said cavity side board portion.

* * * * *